Oct. 23, 1928. 1,688,425
W. LA HODNY ET AL
FASTENER FOR GLASS PLATES
Original Filed May 27, 1924 2 Sheets-Sheet 1
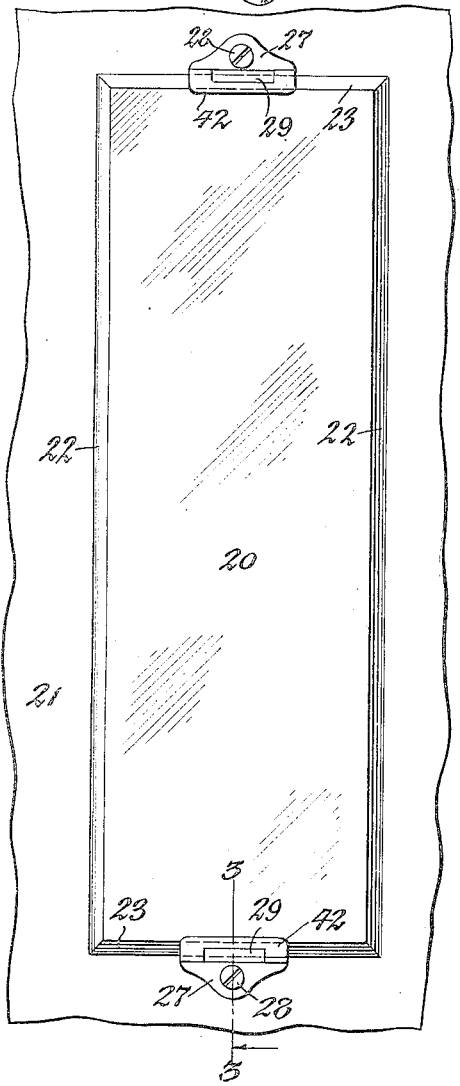
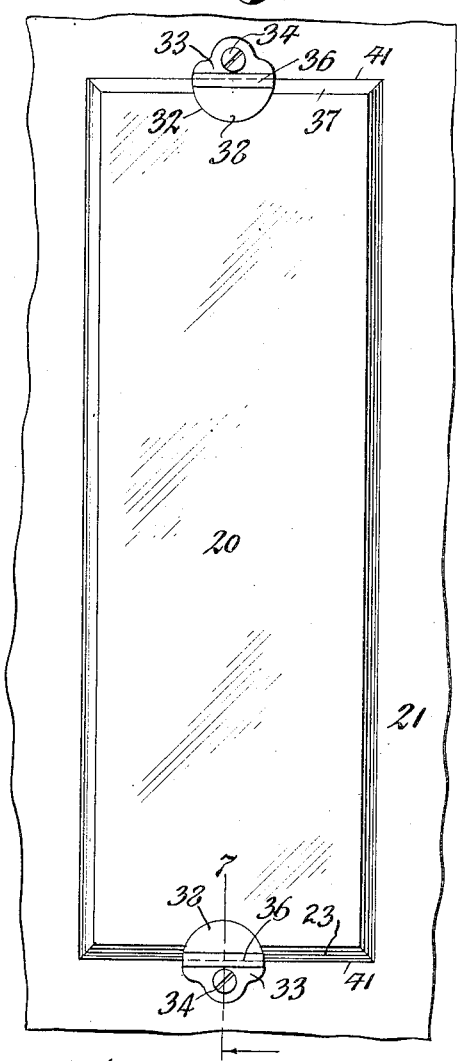
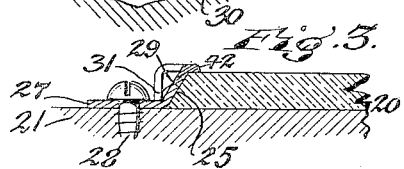
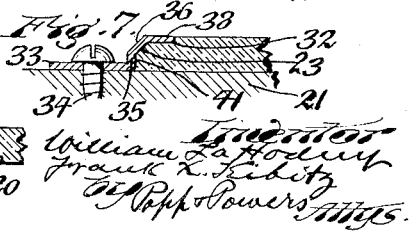

Oct. 23, 1928.
W. LA HODNY ET AL
1,688,425
FASTENER FOR GLASS PLATES
Original Filed May 27, 1924    2 Sheets-Sheet 2
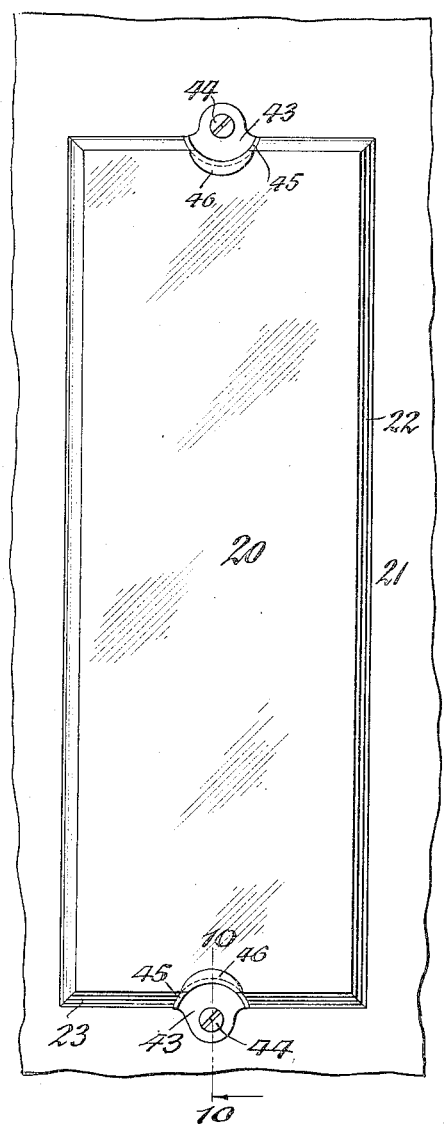
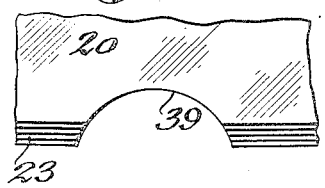
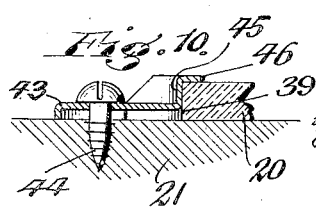
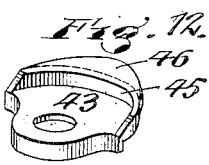

Patented Oct. 23, 1928.

1,688,425

UNITED STATES PATENT OFFICE.

WILLIAM LA HODNY AND FRANK X. KIBITZ, OF BUFFALO, NEW YORK, ASSIGNORS TO STANDARD MIRROR COMPANY, INC., OF BUFFALO, NEW YORK, A CORPORATION OF NEW YORK.

FASTENER FOR GLASS PLATES.

Application filed May 27, 1924, Serial No. 716,256. Renewed September 17, 1927.

The object of this invention is the provision of simple and efficient means for securing glass plates such as push plates to doors or other supports without the necessity of forming holes in the glass plates and thereby avoid the liability of weakening the glass or cracking the same from such holes to the edge of the glass as frequently occurs in plates having such perforations by reason of an uneven pressure of the screws which usually are employed for fastening such glass plates to the support or when subject to other strains such as shrinkage of the wood to which the plate is screwed, or variations in temperature which produces a relative movement of the support and plate.

In the accompanying drawings:

Figure 1 is a front view showing one form of our invention for securing a glass plate to a support.

Figure 2 is a perspective view of one of the clips or fasteners shown in Figure 1 for securing the glass plate to a support.

Figure 3 is a vertical section taken on line 3—3, Fig. 1.

Figure 4 is a fragmentary front view of the glass plate shown in Figures 1 and 3 with the clip detached therefrom.

Figure 5 is a section taken on line 5—5, Fig. 4.

Figure 6 is a front elevation showing a modified form of our invention as compared with that shown in Figures 1 and 2.

Figure 7 is a vertical section taken on the correspondingly numbered line in Figure 6.

Figure 8 is a fragmentary front view of an edge portion of the glass plate showing the manner of constructing the same to receive the clip or fastening shown in Figures 6 and 7.

Figure 9 is a front elevation showing another form of our invention.

Figure 10 is a vertical section taken on line 10—10 of Figure 9.

Figure 11 is a fragmentary front view, on an enlarged scale, of the glass plate shown in Figure 9.

Figure 12 is a perspective view of one of the clips or fasteners shown in Figure 9 for holding the glass plate on its support.

Referring to Figures 1, 2, 3 and 4, the numeral 20 represents a glass plate of oblong rectangular form which is adapted to be arranged on a support 21 in such a position that its long edges 22 are arranged vertically and its transverse edges 23 are arranged horizontally, the upper corners of these edges being beveled as shown at 23 and the lower parts 41 of these edges being arranged at right angles to the front and rear flat surfaces of this plate, as shown in Figure 5.

At each of its horizontal or transverse edges this plate is provided with a notch or recess 24 arranged midway between opposite vertical edges thereof, the bottom of this notch being inclined as shown at 25 and the opposite ends thereof being arranged at right angles to the bottom and parallel with the longitudinal edges thereof as shown at 26.

For the purpose of securing this glass plate to the support two clips or fasteners are employed which connect the same at its upper and lower ends with a support. In the construction shown in Figures 1, 2 and 3 each of these clips comprises a flat base 27 which is adapted to be secured by a screw 28 to the support 21 adjacent to one of the horizontal edges of the plate. Projecting forwardly or rising from the inner edge of this base 27 is a flange which has an inclined central part adapted to project into the adjacent notch 24 and having a beveled inner side 29 which engages with the beveled bottom 25 of this notch while the opposite ends 30 of this inclined portion are adapted to engage with the shoulders 26, 26 of the notch. The marginal parts 31 of this flange at opposite ends of the inclined central part are arranged vertically and adapted to bear against the rear parts 41 of the edges of the plate, which rear parts are at right angles to the front and rear sides of the plate.

At the front ends of the inclined central part of the flange and the perpendicular end portions thereof this flange is provided with an inwardly projecting lip 42 which overhangs the adjacent flat front side of the glass plate and is adapted to engage therewith, as shown in Figures 1 and 3.

By this construction of the clips or fasteners and the manner of engaging the opposite ends of the glass plate the latter is securely attached to the support so as to be held against vertical and horizontal movement thereon and the plate is also held flatwise against the support so as to prevent any dirt from getting between the plate and the support.

Due to the wedging action which is exerted by the inclined face 29 of the central part of each clip bearing against the inclined bottom 25 of the companion notch, each of these clips readily adapts itself to the respective edge of the plate for securely clamping the same against the support while at the same time permitting of a slight variation in the thickness of the plate, or the length of the same, or any slight inaccuracy in the location of the screw 28 with reference to the plate when assembling the parts.

If for any reason a plate should become broken and another one of like character is substituted therefor which necessitates shifting the location of the screws somewhat, the old screw holes will be covered by the base portion 27 of the clip and thereby avoid exposing the marred surface of the wood and avoiding an unsightly appearance.

If desired each of the transverse edges of the glass plate may be provided with a curved notch 32 extending inwardly from the central portion of each of its transverse beveled edges, 37, and each of the clips may be provided with a flat base 33 which is fastened to the support by means of a screw 34 and a hook-shaped flange rising from the inner edge of this base and having a perpendicular inner portion 35 which engages with the perpendicular rear edge portion 41 of the glass plate and an inclined upper portion 36 which engages with the inclined front edge portion 23 of the glass plate, and a front lip 38 of curved form which is arranged parallel with the front and rear sides of the glass plate and engages with the curved notch 32 thereof so that the top of this lip 38 is flush with the front side of the plate, as shown in Figures 6, 7 and 8.

In this construction also the clips operate to fasten the plates to the support so as to reliably hold them against vertical and horizontal movement and also retain them reliably in flatwise engagement with the support.

In the construction shown in Figures 9, 10, 11 and 12 the glass plate is provided at its opposite transverse edges with a curved notch 39 and two clips or fasteners are employed each of which has a base 43 which has its outer part connected by means of a screw 44 with the support 21 while its inner part is curved and provided with a forwardly projecting curved flange 45 engaging with the curved notch 39, and the front end of this flange being provided with an inwardly projecting lip 46 which engages with the top or front side of the glass plate, thereby operating to hold the latter against vertical and horizontal displacement and also preventing the plate from moving away from its support.

These fasteners are comparatively simple in construction and can be produced at low cost, and the same permit not only of fastening the plates to their supports easily and conveniently but they also avoid the liability of fracturing the glass either while handling the same or after the same is installed on its support.

We claim as our invention:

1. A fastening for securing a glass plate having a notch in its edge, to a support, comprising a clip having a base adapted to be secured to said support and arranged parallel with said plate, and a hook flange rising from said base and having a part adapted to engage the notch of said plate and a part adapted to overhang the front side of said plate.

2. A fastening for securing a glass plate having a notch in its edge, to a support, comprising a clip having a base adapted to be secured to said support and arranged parallel with said plate, and a hook flange rising from said base and having a part adapted to engage the notch of said plate and a part adapted to engage with the front side of said plate adjacent to the inner end and the opposite sides of said notch.

3. A fastening for securing to a support a glass plate having a notch in said edge and the inner side of said notch being beveled, comprising a clip having a base adapted to be secured to said support, and a hook flange rising from said base and having an inclined central part adapted to engage with the beveled side of said notch and a marginal part adapted to engage with the edge of the plate and the front of said plate on opposite sides of said central part.

4. A fastening for securing a glass plate to a support, said plate having a notch in its edge, and said fastening comprising a base adapted to be secured to said support, and a flange rising from said base and provided with a projecting central part adapted to engage said notch of the plate and receding parts on opposite sides of the projecting part and adapted to engage the edge of said plate on opposite sides of its notch.

In testimony whereof we affix our signatures.

WILLIAM LA HODNY.
FRANK X. KIBITZ.